Patented Nov. 7, 1922.

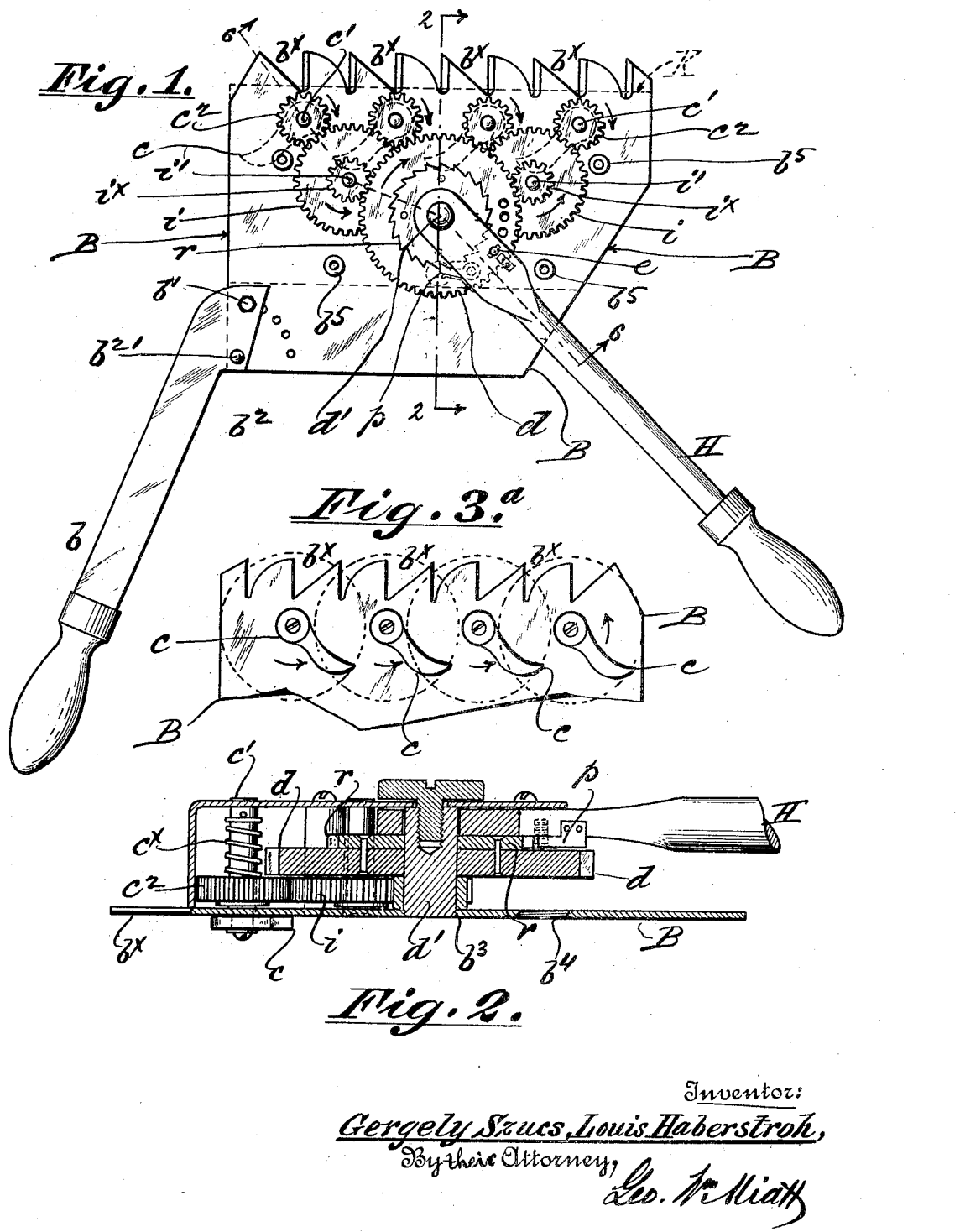

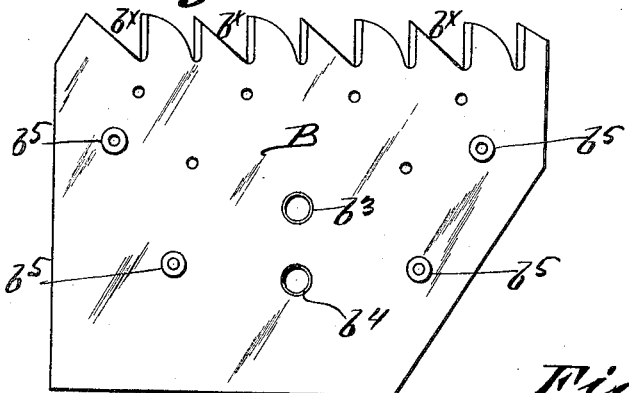
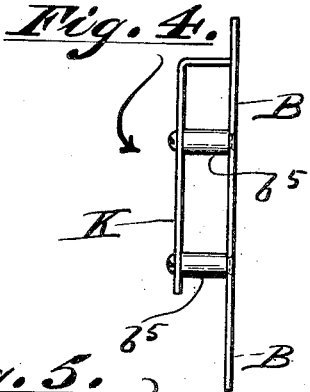
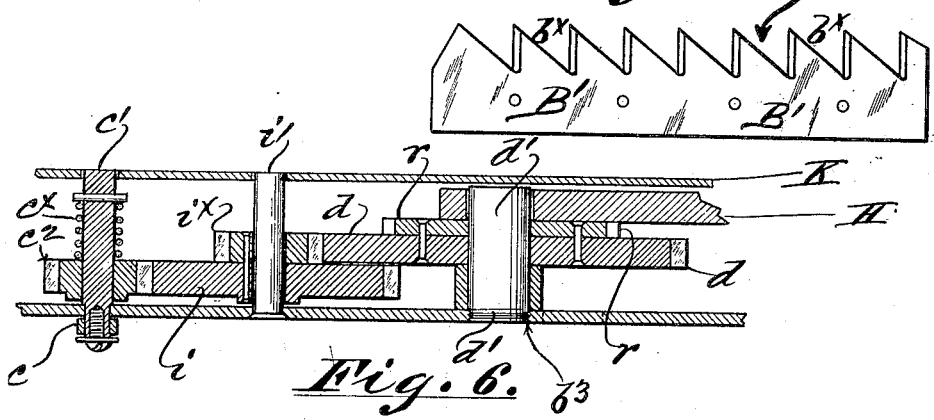
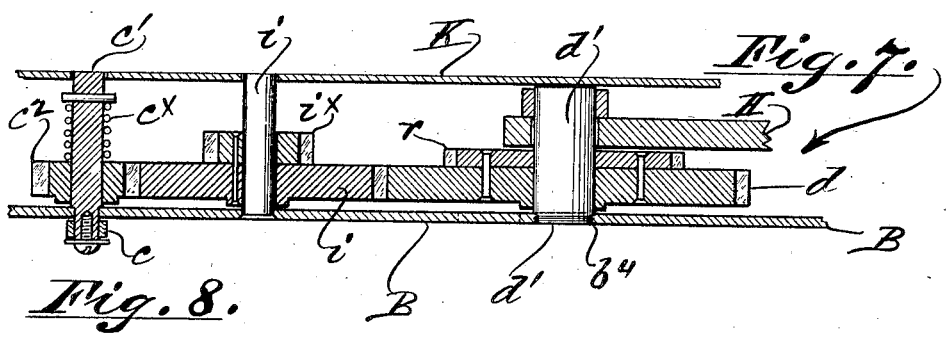

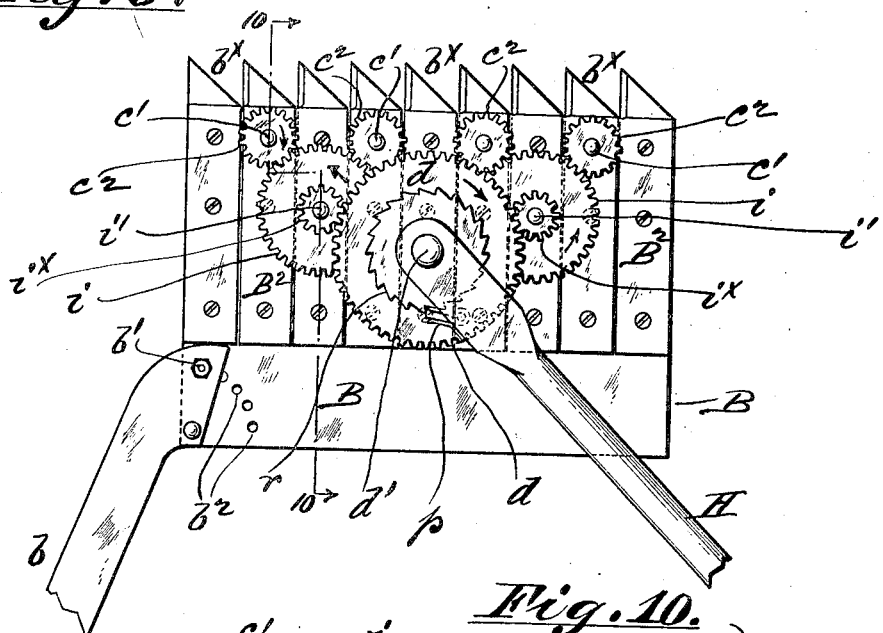
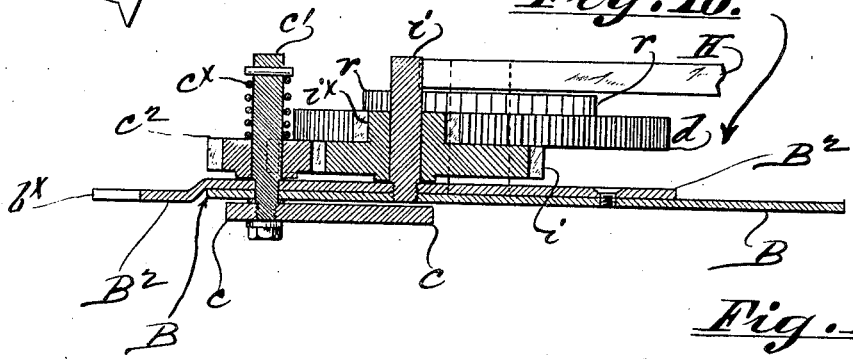
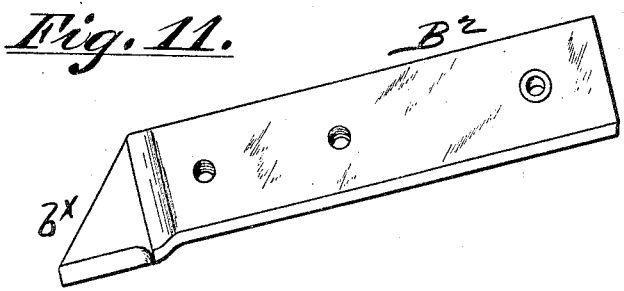
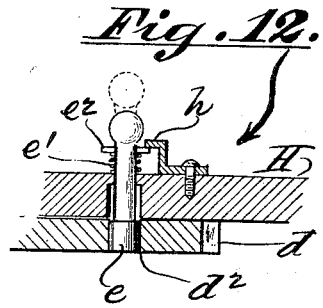

1,434,858

UNITED STATES PATENT OFFICE.

GERGELY SZUCS, OF NEW YORK, AND LOUIS HABERSTROH, JR., OF LYNBROOK, NEW YORK.

SHEARING DEVICE FOR TRIMMING HEDGES, SHRUBBERY, ETC.

Application filed December 9, 1921. Serial No. 521,166.

*To all whom it may concern:*

Be it known that we, GERGELY SZUCS, a citizen of Hungary (having declared my intentions of becoming a citizen of the United States), and a resident of the borough of Manhattan, city, county, and State of New York, and LOUIS HABERSTROH, Jr., a citizen of the United States, and a resident of Lynbrook, county of Nassau, and State of New York, have invented certain new and useful Improvements in Shearing Devices for Trimming Hedges, Shrubbery, Etc., of which the following is a specification.

Our improvements are designed to afford a simple but powerful and effective device adapted to supersede the old fashioned hand shears heretofore used for the trimming of hedges, shrubbery, etc.,—a substitute therefor that will save both time and labor, and insure more uniform and satisfactory results. Also to provide means whereby the speed of operation, and also the effective shearing power, may be changed and varied in accordance with the requirements and exigencies of actual use:—or in other words, adapted to the different degrees of resistance to be overcome in the shearing and trimming of various grades, ages, and thicknesses of shrubbery to be treated.

To this end our invention consists in the specific combination and arrangement of parts and appurtenances described and claimed, distinctive features being the use of a plurality of rotary cutter blades acting in conjunction with a series of fixed cutter teeth; in the means for varying the speed of the said rotary cutters; in the means for counteracting clogging; and other incidental features, all as hereinafter fully set forth.

In the accompanying drawings,

Fig. 1, is a top view of our shearing device, the cover plate being omitted, and the parts being arranged to impart high speed to the rotative cutters;

Fig. 2, is a transverse section, upon a larger scale, taken upon plane of line 2—2, Fig. 1;

Fig. 3, is a detail top view of the bottom or work plate having the fixed cutters forming a component part thereof;

Fig. 3ª, is a detail view of the under side of a portion of the work plate adjacent to the cutting edge, as formed in accordance with Figs. 1 and 3;

Fig. 4, is an end view of the work plate, with the gear cover plate attached thereto;

Fig. 5, is a detail of a fixed cutter tooth plate made separately for rigid attachment to the work plate;

Fig. 6, is a sectional elevation taken upon plane of line 6—6, Fig. 1, only on a larger scale;

Fig. 7, is a section like unto Fig. 6, but showing the main drive gear transposed in position, to reduce the speed of the rotative cutters;

Fig. 8, is a detail of one of the rotary cutters;

Fig. 9, is a top view, like unto Fig. 1, illustrating a modification in which individual fixed cutter teeth are incorporated with the work plate;

Fig. 10, is a transverse section, upon a larger scale, taken upon plane of line 10—10, Fig. 9;

Fig. 11, is a perspective view of one of the fixed individual cutter tooth plates;

Fig. 12, is a detail view showing spring copulative means for locking the actuating lever positively to the main driving gear upon occasion.

What may be designated as the base or work plate B, is formed with a handle $b$, adapted to be held in the left hand of the user, thus constituting the main support for our shearing device during manipulation. Provision is made for varying the degree of angularity of the said handle $b$, as related to the base plate B, by means of a detachable bolt $b'$, and a plurality of holes $b^2$, in the plate B, concentrically positioned as related to the pivotal bolt $b$, as shown more particularly in Figs. 1 and 9, of the drawings.

The front edge of the work plate B, is provided with a series of fixed cutter teeth $b^x$, which may be made in one piece with said work plate B, as in Figs. 1, 2, 3, 3ª, or made separately and rigidly attached thereto, so as to form practically an integral part thereof. Thus in Fig. 5, we show a cutter plate B', formed with a plurality of cutter teeth $b^x$, for attachment to the front edge of the work plate B; whereas in Figs.

9, 10 and 11, the use of a series of independent cutter teeth $b^x$, having individual shanks $B^2$, is shown screwed to the upper face of the base or work plate B, as shown more particularly in Fig. 9.

By preference we form alternate cutter teeth $b^x$, with convexly curved back edges as shown in Figs. 1, 3 and $3^a$, for the purpose of limiting the intake of fibrous material and equalizing the cutting effect, obviating clogging and undue resistance, although this is not an essential feature of our invention, because, for lighter grades of work, the straight back teeth shown in the other views will fully answer the purpose.

In conjunction with the fixed teeth $b^x$, we employ a series of rotative cutters $c$, $c$, mounted on the under side of the work plate B, and actuated by a hand lever H, through the medium of suitable intermediate gearing, substantially as hereinafter set forth. That is to say, the rotative cutters $c$, are each rigidly secured to the lower end of a rotatable shaft $c'$, having bearings in both the work plate B, and the cover plate K, and having rigidly mounted thereon a pinion $c^2$. Meshing with the pinion $c$, is an intermediate gear $i$, loosely mounted on an arbor $i'$, affixed to and between the said work plate B, and the cover plate K, and this intermediate gear $i$, has rigidly attached to it a pinion $i^x$, for engagement, upon occassion, with the drive gear $d$, which latter is loosely mounted on the detachable main arbor or stud $d'$, said drive gear $d$, having rigidly attached to it a ratchet wheel $r$.

The inner end of the hand lever H, is fulcrumed on the detachable main arbor $d'$, and carries a spring pawl $p$, for engagement with the said ratchet wheel $r$, so as to be capable of rotating said ratchet wheel $r$, and drive gear $d$, in one direction only, from right to left, or clockwise, as shown in the drawings.

The detachable main arbor $d'$, is screw threaded at its lower extremity for engagement with either of the female screw-threaded sockets $b^3$, or $b^4$, (see Figs. 2, 3, 6 and 7). Thus, when speed of rotation for the cutting blades $c$, is desirable, as in the trimming of shrubbery of light and tender structure, we position the main stud or arbor $d'$, in the forward screw socket $b^3$, as in Figs. 1, 2, 6, 9 and 10, in which case the drive gear $d$, will mesh with the pinion $i^x$, on the intermediate gear $i$, and the pinion $c^2$, and cutter $c$, will be rotated at a relatively high rate of speed; whereas if tough, thick twigs or branches of foliage are to be treated, we position said main arbor $d'$, in the rear screw socket $b^4$, in which case the drive gear $d$, meshes directly with intermediate gear $i$, as shown in Fig. 7, resulting in slower motion imparted to the pinion $c^2$, and cutter, but in increased shearing power,—the rotative cutter $c$, of course in both cases acting in conjunction with the stationary teeth $b^x$, to sever the material interposed therebetween.

The cover plate K, when used, as is preferable in order to prevent the fouling or clogging of the gearing by severed parts or particles of the plants treated, is supported on the base plate B, and spaced apart therefrom, by studs $b^5$, $b^5$, or by equivalent means as may be found most expedient.

In order to accomplish the reversal of motion of the rotative cutters $c$, in case of clogging and wedging of tough, hard material between the fixed teeth $b^x$, or between them and the said rotative cutters $c$, we provide means whereby the hand lever H, may be temporarily attached to the drive wheel $d$, so that the latter may be turned backward sufficiently to cause the rotary cutters to recede or back away from the shearing edges of the fixed teeth $b^x$, thereby releasing the clogging substance. Obviously this positive interlocking between the drive gear $d$, and the hand lever H, may be effected by various mechanical expedients other than that shown in the accompanying drawings, in which $e$, represents a plunger bolt held normally out of engagement with the mortises $d^2$, $d^2$, (concentrically arranged as related to the arbor $d'$) by a spring $e'$, interposed between the upper side of the handle lever H, and a cross bar $e^2$, on the upper portion of said plunger bolt $e$. When it is desired to connect the handle H, temporarily with the drive gear $d$, for the purpose stated, the handle H, is turned to the right until the plunger bolt $e$, is in coincidence with one of the recesses $d^2$, and the bolt is then depressed against the resistance of said spring $e'$, and the bolt turned on its axis so that its cross bar $e^2$, engages with the detent shoulder $h$, on the hand lever H, as shown in Fig. 12, thereby holding the lower end of the bolt in the said mortise $d^2$, in the drive gear $d$, and locking the parts together until again released by the partial rotation of the bolt $e$, in such manner that its cross bar $e^2$, is out of contact with the detent shoulder $h$, when the spring $e'$, retracts the bolt $e$, to its normal position with its lower extremity within the body of the hand lever H, and clear of the drive gear $d$, thereby releasing the hand lever H, so that it is free to actuate the ratchet $r$.

The dotted circles in Fig. $3^a$, indicate the scope of rotation of the cutter blades $c$, $c$, as related to the fixed teeth $b^x$, $b^x$, and it will be seen that each rotative blade $c$, acts in conjunction with a plurality of the fixed teeth $b^x$.

Each intermediate gear $i$, meshes with two adjoining rotative cutter pinions $c^2$, as shown in Figs. 1 and 9, of the drawings; and the drive gear $d$, is interposed between, and meshes with both pinions $i^x$, of the said intermediate gears $i$, as also shown in said figures, so that a maximum of efficiency is attained with a minimum of operative parts and gears.

For cheapness and simplicity of construction the cutter teeth $b^x$, may be made in one piece with the base or work plate B, as in Figs. 1, 2, 3 and 3ª, the main advantage in making them separate from said work plate and then detachably but rigidly securing them thereto, as in Figs. 5, 9, 10 and 11, resting in the fact that they may be removed for sharpening or substitution upon occassion therefor.

By the use of our multiple shearing mechanism we not only effect a substantial saving in time and labor, but also attain better and more uniform results,—the line of severance and trim being straight and accurate. Furthermore the power is applied to the best advantage, and more economically as compared with hand clipping by means of a pair of shears as heretofore.

The pinions $c^2$, may be spline attached to their shafts $c'$, in which case springs $c^x$, may be positioned upon said shafts to hold the pinions $c^2$, in position against the work plate B.

What we claim as our invention and desire to secure by Letters Patent is:

1. A multiple shearing device of the character designated, comprising a plurality of fixed cutter teeth, a plurality of rotative cutter blades operating in conjunction therewith, and mechanism for actuating said rotative cutter blades, consisting of a hand lever, pawl and ratchet, main driving gear, and intermediate gears, substantially in the manner and for the purpose described.

2. A multiple shearing device of the character designated, comprising a plurality of fixed cutter teeth, a plurality of rotative cutter blades operating in conjunction therewith, and mechanism for actuating said rotative cutter blades, consisting of a hand lever, pawl and ratchet, main driving gear, and intermediate gears, together with means for temporarily coupling the hand lever to the main driving gear, substantially in the manner and for the purpose described.

3. A multiple shearing device of the character designated, comprising a plurality of fixed cutter teeth, a plurality of rotative cutter blades operating in connection therewith and each rigidly attached to a rotatable shaft, pinions attached to said rotatable shafts, intermediate gears meshing with said pinions, a main driving gear for actuating said intermediate gears, a ratchet wheel rigid on said main driving gear, and a hand lever having a pawl engaging with said ratchet wheel, substantially in the manner and for the purpose described.

4. A multiple shearing device of the character designated, comprising a plurality of fixed cutter teeth, a plurality of rotative cutter blades operating in connection therewith and each rigidly attached to a rotatable shaft, pinions attached to said rotatable shafts, intermediate gears meshing with said pinions, a main driving gear for actuating said intermediate gears, a ratchet wheel rigid on said main driving gear, and a hand lever having a pawl engaging with said ratchet wheel, together with a work plate on which said mechanism is mounted, and a handle attached to said work plate by means which admit of its adjustment thereon, substantially in the manner and for the purpose described.

5. A multiple shearing device of the character designated, comprising a work plate formed in one piece with a plurality of fixed cutting teeth, a plurality of rotative cutter blades operating in conjunction therewith, and mechanism for actuating said rotative cutter blades, consisting of a hand lever, pawl and ratchet, main driving gear, and intermediate gears, substantially in the manner and for the purpose described.

6. A multiple shearing device of the character designated, comprising a plurality of fixed cutter teeth the alternate members of which are formed with convexly curved rear edges, a plurality of rotative cutter blades operating in conjunction therewith, and mechanism for actuating said rotative cutter blades, consisting of a hand lever, pawl and ratchet, main driving gear, and intermediate gears, substantially in the manner and for the purpose described.

7. A multiple shearing device of the character designated, comprising a work plate formed with two screw socket holes spaced apart for alternate engagement with a detachable screw threaded arbor stud, said arbor stud forming the support for a main drive gear, said main driving gear and a ratchet wheel integral therewith, a hand lever fulcrumed on said detachable arbor stud and formed with a spring pawl engaging said ratchet, a series of fixed cutter teeth on said work plate, a series of rotative cutter blades mounted on said work plate and each provided with an actuating pinion, and intermediate gearing between said pinions and said main drive gear, substantially in the manner and for the purpose described.

8. A multiple shearing device of the character designated, comprising a work plate formed with two screw socket holes spaced apart for alternate engagement with a detachable screw threaded arbor stud, said arbor stud forming the support for a main drive gear, said main driving gear and a ratchet wheel integral therewith, a hand lever fulcrumed on said detachable arbor stud and formed with a spring pawl engaging said ratchet, a series of fixed cutter teeth on said work plate, a series of rotative cutter blades mounted on said work plate and each provided with an actuating pinion, and intermediate gears between said pinions and said main driving gear, said intermediate gear being provided with pinions integral therewith, substantially in the manner and for the purpose described.

GERGELY SZUCS.
LOUIS HABERSTROH, Jr.

Witnesses:
  DOROTHY M. CARMICHAEL,
  GEO. WM. MIATT.